(12) United States Patent
Yabuhara et al.

(10) Patent No.: US 11,651,186 B2
(45) Date of Patent: May 16, 2023

(54) RFID TAG AND RFID TAGGED ARTICLE

(71) Applicant: Murata Manufacturing Co., Ltd., Nagaokakyo (JP)

(72) Inventors: Yuki Yabuhara, Nagaokakyo (JP); Kengo Matsumoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 96 days.

(21) Appl. No.: 16/830,431

(22) Filed: Mar. 26, 2020

(65) Prior Publication Data

US 2020/0293853 A1 Sep. 17, 2020

Related U.S. Application Data

(63) Continuation of application No. PCT/JP2019/044230, filed on Nov. 12, 2019.

(30) Foreign Application Priority Data

Mar. 13, 2019 (JP) .............................. JP2019-045575

(51) Int. Cl.
G06K 19/077 (2006.01)
G06K 19/07 (2006.01)

(52) U.S. Cl.
CPC ... *G06K 19/07779* (2013.01); *G06K 19/0708* (2013.01); *G06K 19/07724* (2013.01)

(58) Field of Classification Search
CPC .............................................. G06K 19/07779
USPC ....................................................... 235/492
See application file for complete search history.

(56) References Cited

U.S. PATENT DOCUMENTS

2011/0253795 A1* 10/2011 Kato ..................... H01Q 1/2208
235/492
2011/0267254 A1* 11/2011 Semar .............. G06K 19/07783
343/870
2019/0228283 A1 7/2019 Eshima et al.

FOREIGN PATENT DOCUMENTS

| JP | H11216627 A | 8/1999 |
| JP | 2007280314 A | 10/2007 |
| JP | 2016048544 A | 4/2016 |
| JP | 2017135481 A | 8/2017 |
| WO | 2018092583 A1 | 5/2018 |

OTHER PUBLICATIONS

Written Opinion of the International Searching Authority issued for PCT/JP2019/044230, dated Oct. 12, 2019.
International Search Report issued for PCT/JP2019/044230, dated Oct. 12, 2019.
Japanese Office Action issued for Japanese Application No. 2020-504045, dated Mar. 31, 2020 (English translation attached).

* cited by examiner

*Primary Examiner* — Rafferty D Kelly
(74) *Attorney, Agent, or Firm* — ArentFox Schiff LLP

(57) ABSTRACT

An RFID tag includes a first conductor and second conductors that are connected to each other to provide a main portion or all of a coil-shaped conductor or a loop-shaped conductor. Moreover, an RFIC is connected to the second conductors or is electromagnetically coupled to the second conductors. The first conductor includes terminals provided such that an end projects outward from a winding range of the coil-shaped conductor or a loop-shaped conductor while the first conductor is connected to the second conductors.

20 Claims, 14 Drawing Sheets

RFID TAG AND RFID TAGGED ARTICLE

CROSS REFERENCE TO RELATED APPLICATIONS

The present application is a continuation of PCT/JP2019/044230 filed Nov. 12, 2019, which claims priority to Japanese Patent Application No. 2019-045575, filed Mar. 13, 2019, the entire contents of each of which are incorporated herein by reference.

FIELD OF THE INVENTION

The present invention relates to a radio frequency identification (an RFID) tag configured to be used while being attached to a metal article, and an RFID tagged article including the metal article and the RFID tag.

BACKGROUND

In general, International Publication No. 2018/092583 discloses an RFID tag to be attached to a metal surface, and an RFID tagged article. Specifically, the RFID tag includes a resin block, a substrate provided in the resin block, an RFIC element mounted on the substrate, and a loop electrode connected to the RFIC element. The RFID tag is adhered to the metal surface, for example, through an adhesive layer.

In the RFID tagged article disclosed in International Publication No. 2018/092583, the RFID tag adhered to a metal surface with an adhesive may come off relatively easily due to the environment (i.e., external factors) such as ambient atmosphere, liquid quality, changes in temperature, and an impact. Further, for example, a small steel article such as a medical instrument is exposed to a high temperature environment when sterilization treatment is performed. In such a high temperature environment, since a volatile chemical substance (i.e., released gas) called out gas may be released from the adhesive, the structure of the RFID tagged article may not be suitable for a medical instrument or the like with an RFID tag.

SUMMARY OF THE INVENTION

In view of the foregoing, exemplary embodiments of the present invention provide an RFID tag and an RFID tagged article that have a high environmental resistance and have no risk of generating a released gas.

Accordingly, an RFID tag according to an exemplary aspect includes a first conductor and a second conductor that are connected to each other to provide a main portion or all of a coil-shaped conductor or a loop-shaped conductor. Moreover, an RFIC is connected to the second conductor, and the first conductor includes an end portion projecting outward from a winding range of the coil-shaped conductor or the loop-shaped conductor while the first conductor is connected to the second conductor.

In addition, an RFID tagged article according to an exemplary aspect includes an article including a conductive element, and the RFID tag, and the RFID tagged article is structured such that the terminal of the RFID tag is welded to the conductive element.

According to the exemplary embodiments provided herein, an RFID tag and an RFID tagged article are provided that have a high environmental resistance and have no risk of generating a released gas.

The above and other elements, features, steps, characteristics and advantages of the exemplary embodiments will become more apparent from the following detailed description of the preferred embodiments with reference to the attached drawings.

DETAILED DESCRIPTION OF THE PREFERRED EMBODIMENTS

Figure 1:
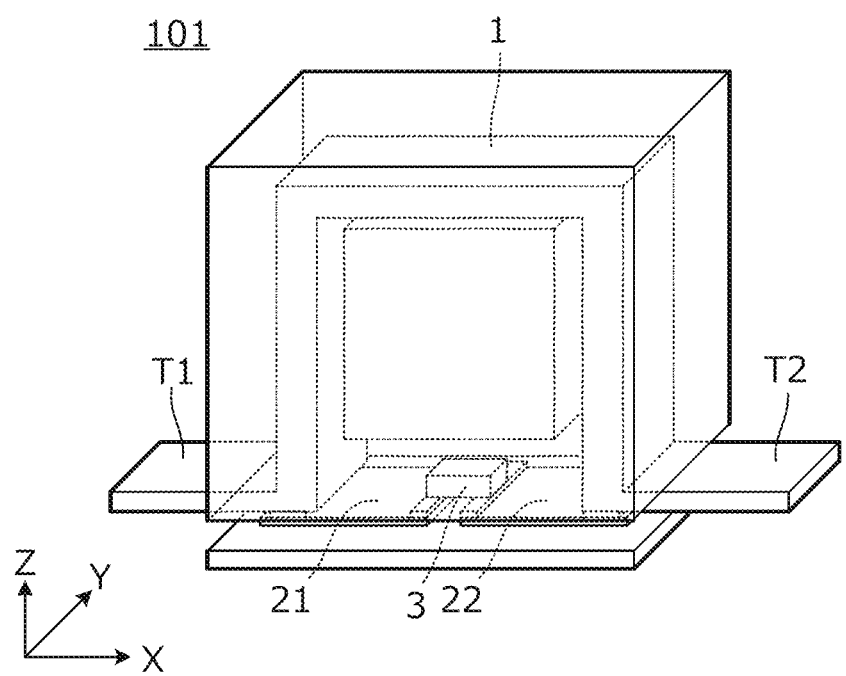
FIG. 1 is an external perspective view of an RFID tag 101 according to a first exemplary embodiment of the present invention.

Hereinafter, a plurality of exemplary embodiments of the present invention will be described in detail with reference to the attached drawings and several specific examples. It is noted that in the drawings, components and elements assigned with the same reference numerals or symbols will represent the same or corresponding components and elements. While an exemplary embodiment of the present invention are divided and described into the plurality of exemplary aspects for the sake of convenience in consideration of ease of description or understanding of main points, elements described in different exemplary embodiments are able to be partially replaced or combined with each other as should be appreciated to one skilled in the art. In second and subsequent exemplary embodiments, a description of features common to the first exemplary embodiment will be omitted, and different features will be mainly described. In particular, the same or substantially the same advantageous functions and effects by the same configurations will not be described one by one for each exemplary embodiment.

First Exemplary Embodiment

Figure 2A:
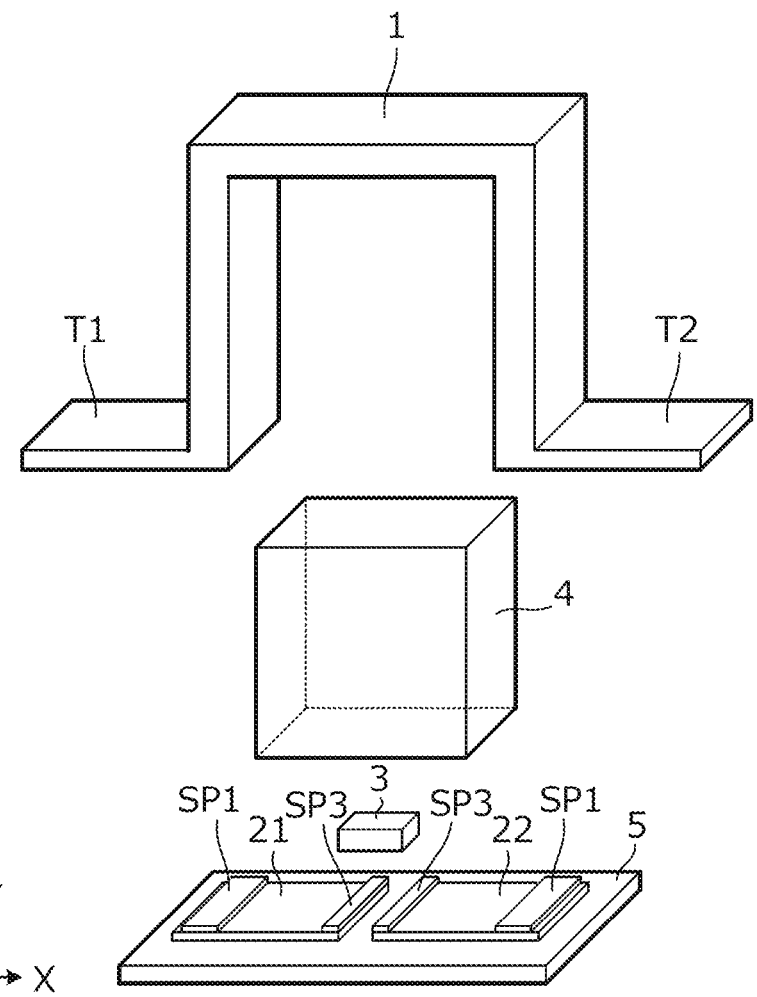
FIG. 2A and FIG. 2B are diagrams showing a structure and a component of the RFID tag 101.
Figure 2B:
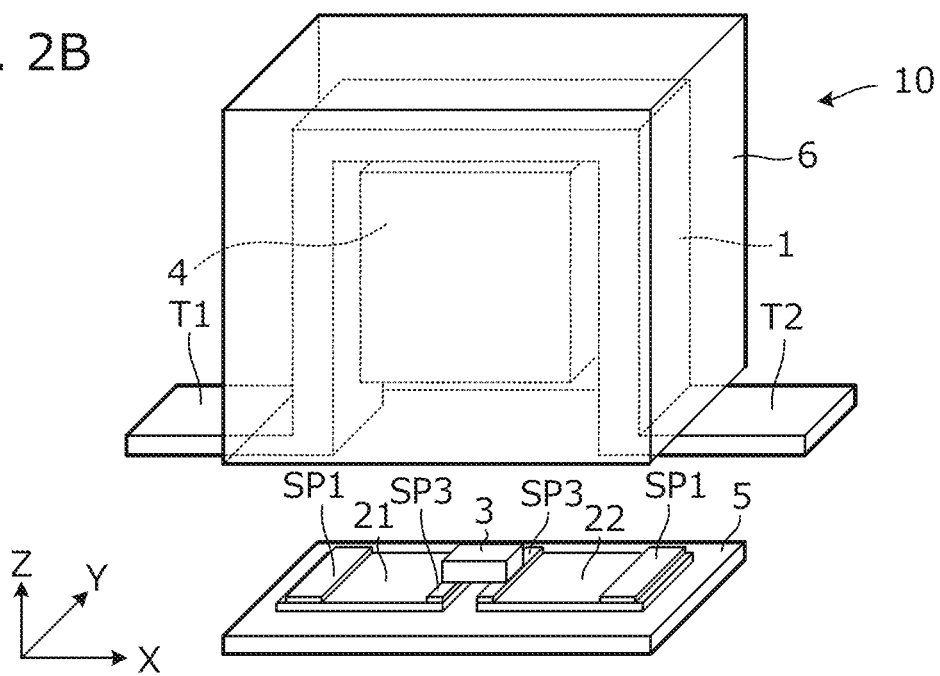
Figure 3:
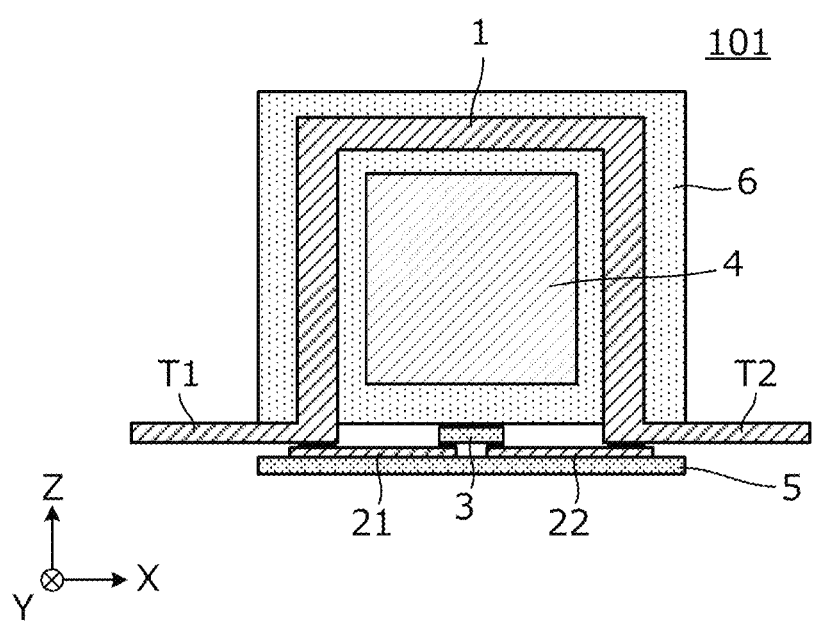
FIG. 3 is a vertical cross-sectional view of the RFID tag 101.

FIG. 1 is an external perspective view of an RFID tag 101 according to a first exemplary embodiment. FIG. 2A and FIG. 2B are diagrams showing a structure and a component of the RFID tag 101. FIG. 3 is a vertical cross-sectional view of the RFID tag 101.

As shown in FIG. 1, the RFID tag 101 according to the first exemplary embodiment includes inside a first conductor 1 and second conductors 21 and 22, and includes terminals T1 and T2 that are made of metal and project outside. As will be described later, the terminals T1 and T2 are welded to a conductive element to provide an RFID tagged article in the exemplary embodiment.

As shown in FIG. 2B, the RFID tag 101 includes a first conductor element 10, an insulating base material 5, and an RFIC 3. Specifically, the RFIC 3 and the first conductor element 10 are mounted on the insulating base material 5 to provide the RFID tag 101 shown in FIG. 1.

The first conductor element 10 includes a first conductor 1, a magnet 4, and a molding resin 6 that covers the first conductor 1 and the magnet 4. In other words, a portion of the first conductor 1 and the entirety of the magnet 4 are resin-molded with the molding resin 6 and integrated together. As further shown, the magnet 4 has a rectangular parallelepiped shape, and is covered with the molding resin 6 while the three surfaces are surrounded by the first conductor 1. The first conductor 1 is a body of a metal plate made of iron, copper, brass, stainless steel, titanium, or aluminum, for example. Moreover, the magnet 4 is a ferrite magnet, a samarium cobalt magnet, or a neodymium magnet, for example. The insulating base material 5 is a glass epoxy base material, for example, and the second conductors 21 and 22 are copper foil patterns, for example. In an exemplary aspect, the molding resin 6 is a body made of a hard resin material such as epoxy resin, for example.

The second conductors 21 and 22 are provided on the insulating base material 5. Solder paste patterns SP1 and SP3 are applied and provided on the second conductors 21 and 22. The RFIC 3 is placed on the solder paste patterns SP3 and SP3, a root portion of the terminals T1 and T2 of the first conductor element 10 is placed on the solder paste patterns SP1 and SP1, and, by a subsequent solder reflow process, the RFIC 3 and the first conductor element 10 are mounted on the insulating base material 5. In other words, the RFIC 3 and the first conductor 1 are electrically connected to the second conductors 21 and 22.

The terminals T1 and T2 exposed to a lower surface of the first conductor element 10 are in contact with the solder paste patterns SP1 and SP1, and the terminals T1 and T2 are soldered to the second conductors 21 and 22 by the solder reflow process according to an exemplary aspect.

As shown in FIG. 2A, the first conductor 1 is an element provided such that the metal plate is bent at a right angle in four places. In each diagram such as FIG. 2A and FIG. 2B, although a bent portion of the first conductor 1 is shown so that neither the inside nor the external surface may have a roundness, the bent portion may have a rounded shape in an alternative aspect. In a state in which the first conductor 1 is connected to the second conductors 21 and 22, the first conductor 1 and the second conductors 21 and 22 define a loop-shaped conductor. Then, the terminals T1 and T2 are structured to project outward from the winding range of the loop-shaped conductor. The RFIC 3 is inserted in the middle of the loop-shaped conductor defined by the first conductor 1 and the second conductors 21 and 22, that is, the first conductor 1, the second conductors 21 and 22, and the RFIC 3 define an electrical loop.

A winding axis direction of the loop-shaped conductor, in an orthogonal X-Y-Z coordinate system shown in FIG. 1, FIG. 2A, and FIG. 2B, is a direction parallel to a Y axis. The loop-shaped conductor is a rectangle, when viewed in the winding axis direction, and the first conductor 1 provides three sides of the rectangle, and the second conductors 21 and 22 provide a remaining one side of the rectangle.

Figure 4A:
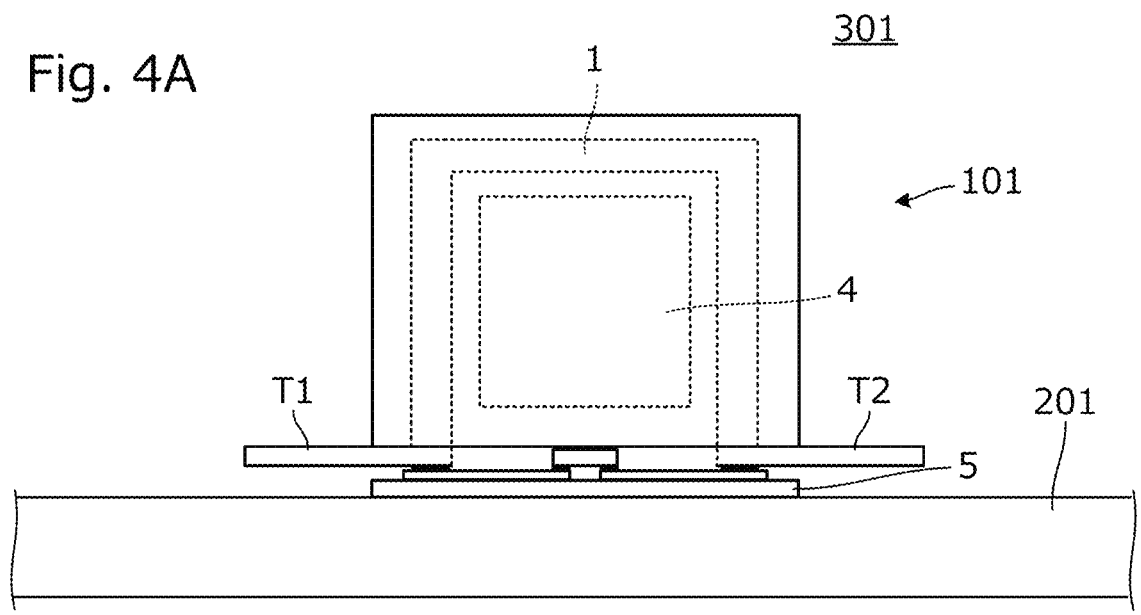
FIG. 4A is a diagram showing a state in the middle of configuring an RFID tagged article 301.
Figure 4B:
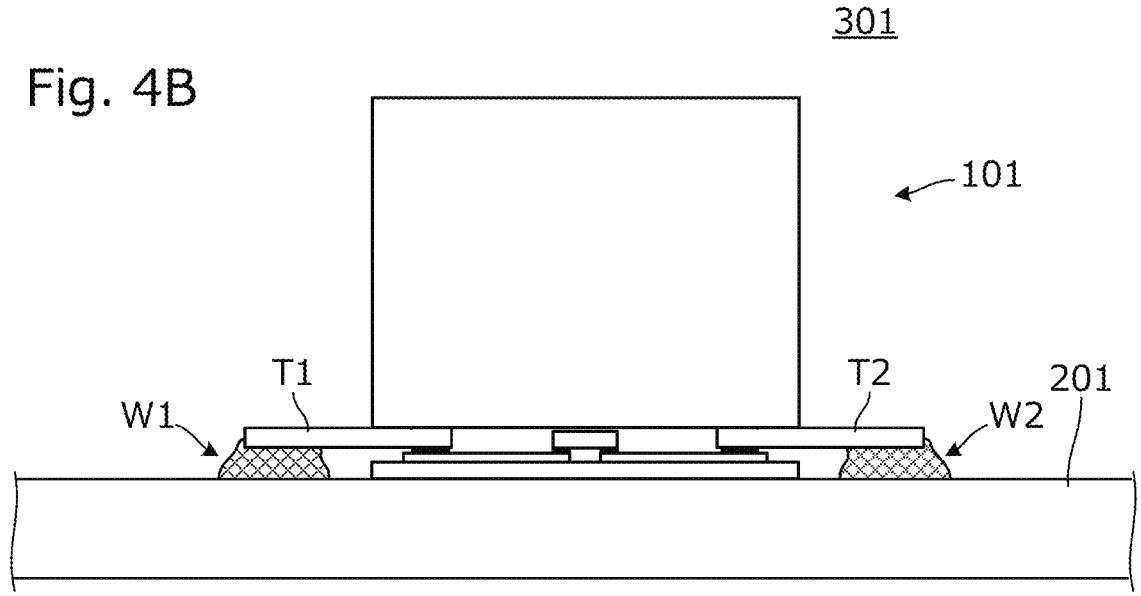
FIG. 4B is a diagram showing a configuration of the RFID tagged article 301.

FIG. 4A is a diagram showing a state in the middle of configuring an RFID tagged article 301, and FIG. 4B is a diagram showing a configuration of the RFID tagged article 301. The RFID tagged article 301 includes a conductive element 201 and an RFID tag 101. First, as shown in FIG. 4A, the RFID tag 101 is placed on the conductive element 201, and the terminals T1 and T2 of the RFID tag 101 are brought closer to a surface of the conductive element 201. Subsequently, the terminals T1 and T2 of the RFID tag 101 can be welded to the conductive element 201 to provide welded portions W1 and W2 between the terminals T1 and T2 and the conductive element 201. Accordingly, an RFID tagged article 301 shown in FIG. 4B is provided.

The conductive element 201 is an element made of iron (steel), for example. As shown in FIG. 4A, when the RFID tag 101 is placed on the conductive element 201, the magnet 4 attracts the conductive element 201, so that the RFID tag 101 is attracted to the conductive element 201. Therefore, a possibility that the RFID tag 101 may come off from the surface of the conductive element 201 is reduced. In addition, a positional shift and inclination of the RFID tag 101 can be prevented during welding, which makes it possible to easily attach the RFID tag 101 to a fixed position.

Methods of the welding include fusion welding, such as arc welding or laser welding, for example, and pressure welding, such as resistance spot welding.

Figure 5:
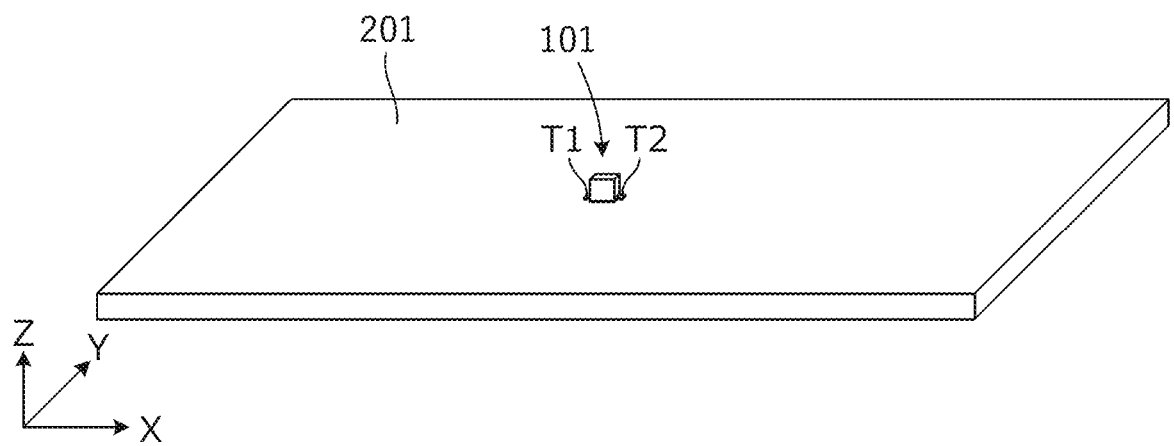
FIG. 5 is a perspective view of the RFID tagged article 301.

FIG. 5 is a perspective view of the RFID tagged article 301. The RFID tagged article 301 includes a conductive element 201 and an RFID tag 101. The RFID tag 101 includes terminals T1 and T2 that are welded to the conductive element 201. In such a state, the RFID tagged article 301 is provided.

According to the exemplary aspect, the RFID tag 101 is configured to communicate with an RFID tag reader (or an RFID tag reader/writer) while being magnetically coupled to each other. In other words, communication is performed in a state in which magnetic flux generated from the RFID tag reader (or the RFID tag reader/writer) interlinks an open surface of the electrical loop defined by the first conductor 1, the second conductors 21 and 22, and the RFIC 3.

It is to be noted that the first conductor 1 and the second conductors 21 and 22 are electrically connected to the conductive element 201. Accordingly, the conductive element 201 can be configured to be used as a portion of an emitter.

Figure 6:
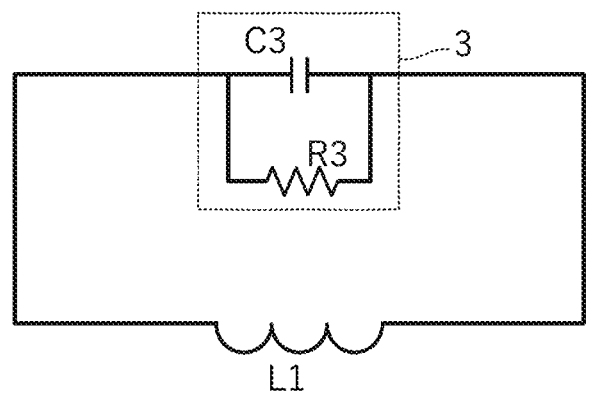
FIG. 6 is an equivalent circuit diagram of the RFID tagged article 301.

FIG. 6 is an equivalent circuit diagram of the RFID tagged article 301. In FIG. 6, an inductor L1 is an inductor provided by a loop defined by the first conductor 1 and the second conductors 21 and 22. In addition, in this example, the RFIC 3 is represented by a parallel circuit including a capacitor C3 and a resistance element R3.

The magnet 4 is disposed inside the loop defined by the first conductor 1 and the second conductors 21 and 22, so that the magnet 4 functions as a magnetic core. Therefore, despite a loop of substantially one turn, a predetermined inductance is able to be easily obtained. In addition, despite overall small size, it is possible to set a resonant frequency to a predetermined one.

In FIG. 6, the capacitor C3 and the inductor L1 define an LC parallel resonant circuit. The resonant frequency of the LC parallel resonant circuit is a frequency in or near a frequency band used for an RFID tag.

Figure 7:
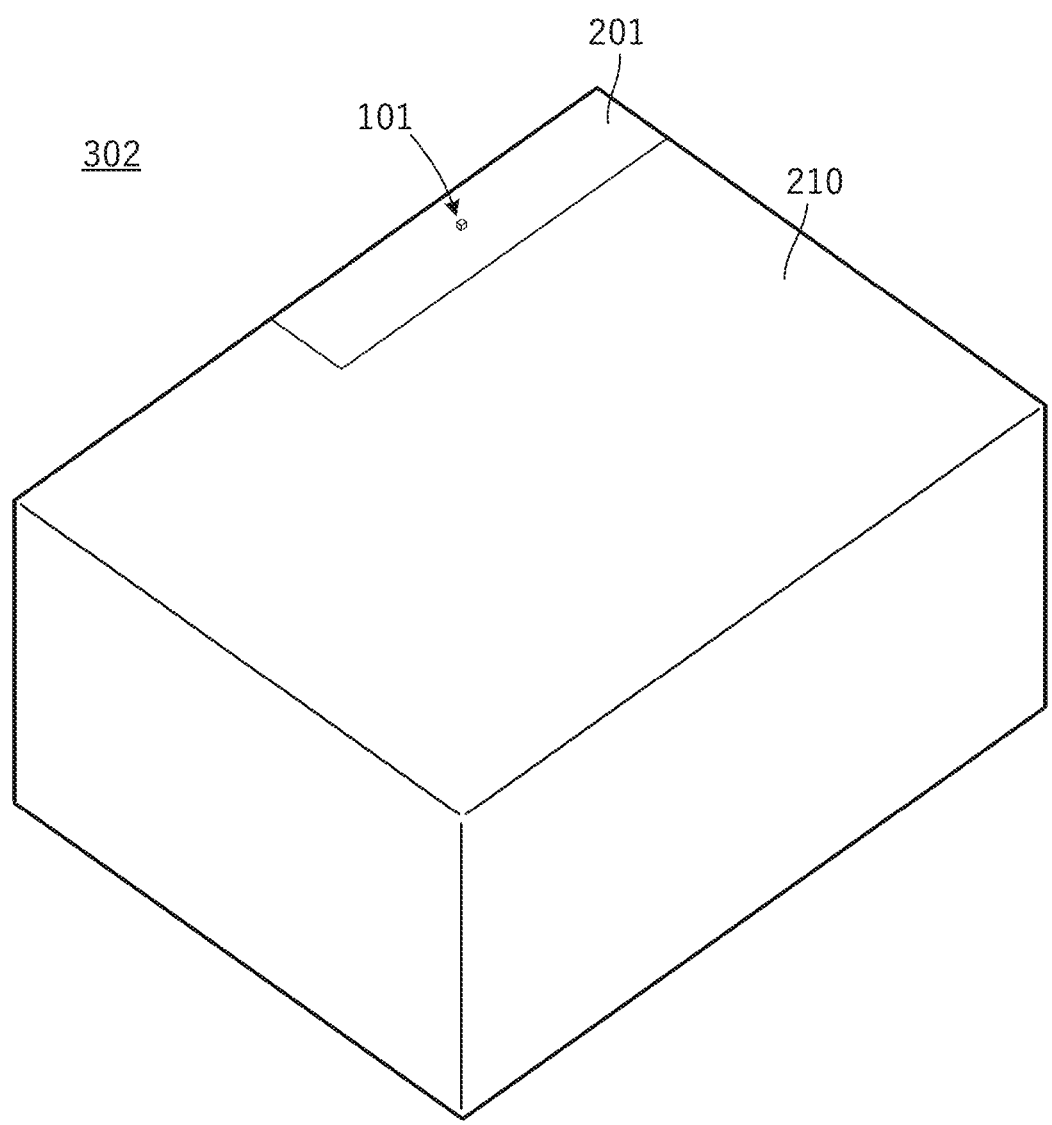
FIG. 7 is a perspective view of an RFID tagged article 302.

Subsequently, an RFID tagged article will be described. FIG. 7 is a perspective view of an RFID tagged article 302. The RFID tagged article 302 includes an article body 210, a conductive element 201, and an RFID tag 101. In an exemplary aspect, the RFID tag 101 is screwed to the conductive element 201 being a portion of the RFID tagged article 302. In this example, the article body 210 is made of an electrically insulating material.

In this manner, an RFID tagged article can be provided, such that the RFID tag 101 is attached to the conductive element 201 being a portion of the RFID tagged article 302.

Figure 8:
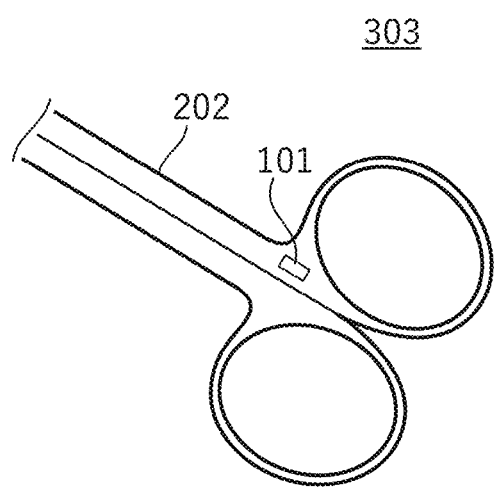
FIG. 8 is a partial plan view of an RFID tagged article 303.

FIG. 8 is a partial plan view of an RFID tagged article 303. The RFID tagged article 303 is an article obtained by attaching the RFID tag 101 to a small steel article 202 such as hemostatic forceps or medical scissors. The terminals of the RFID tag 101 are welded to the small steel article 202.

As with the small steel article 202 shown in FIG. 8, the small steel article 202 to which the RFID tag 101 is attached, in a case of being a medical instrument (e.g., medical scissors), may be exposed to a high temperature environment for sterilization treatment. In a case in which the RFID tag 101 is attached to the small steel article 202 with an adhesive, there is a possibility that out gas is generated from the adhesive. Further, in a case in which the RFID tag 101 is attached to the small steel article 202 with a rubber tube, it is impossible to sterilize the interior of the rubber tube, and thus sufficient sterilization treatment is unable to be performed.

In contrast, according to the first exemplary embodiment, it is possible to attach the RFID tag 101 to the small steel article 202 by welding without using an adhesive or a rubber tube.

Second Exemplary Embodiment

A second exemplary embodiment describes an RFID tag and an RFID tagged article that are different from the first exemplary embodiment in the configurations of the first conductor and the second conductor.

Figure 9:
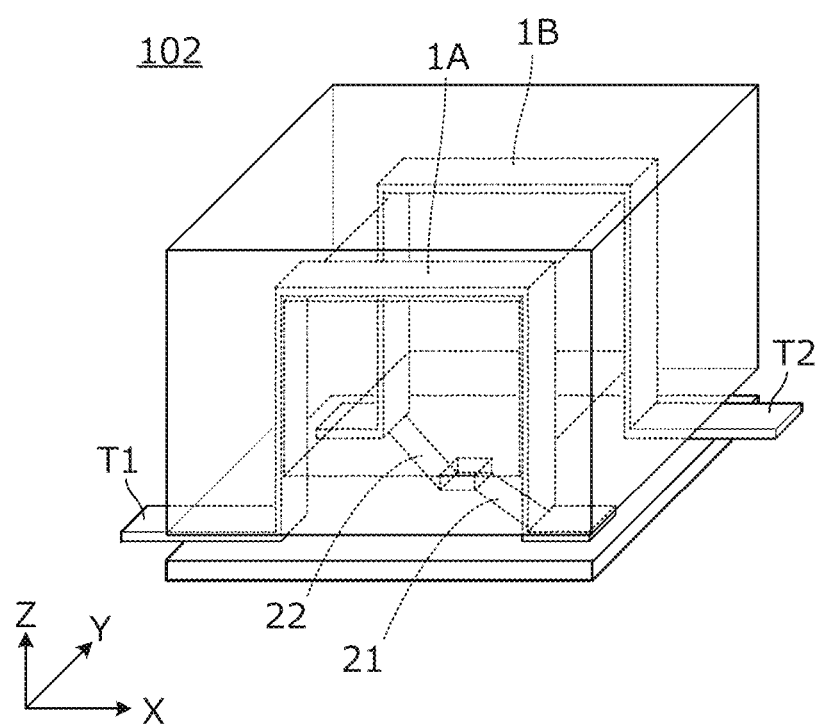
FIG. 9 is an external perspective view of an RFID tag 102 according to a second exemplary embodiment of the present invention.
Figure 10A:
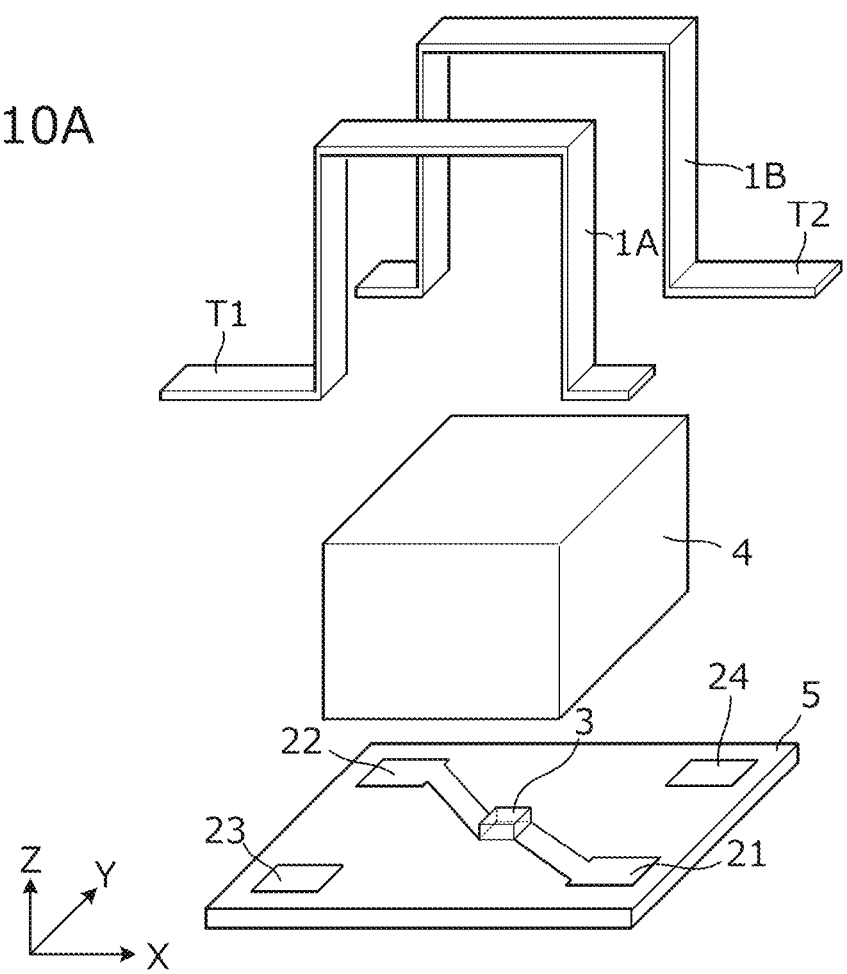
FIG. 10A and FIG. 10B are diagrams showing a structure and a component of the RFID tag 102.
Figure 10B:
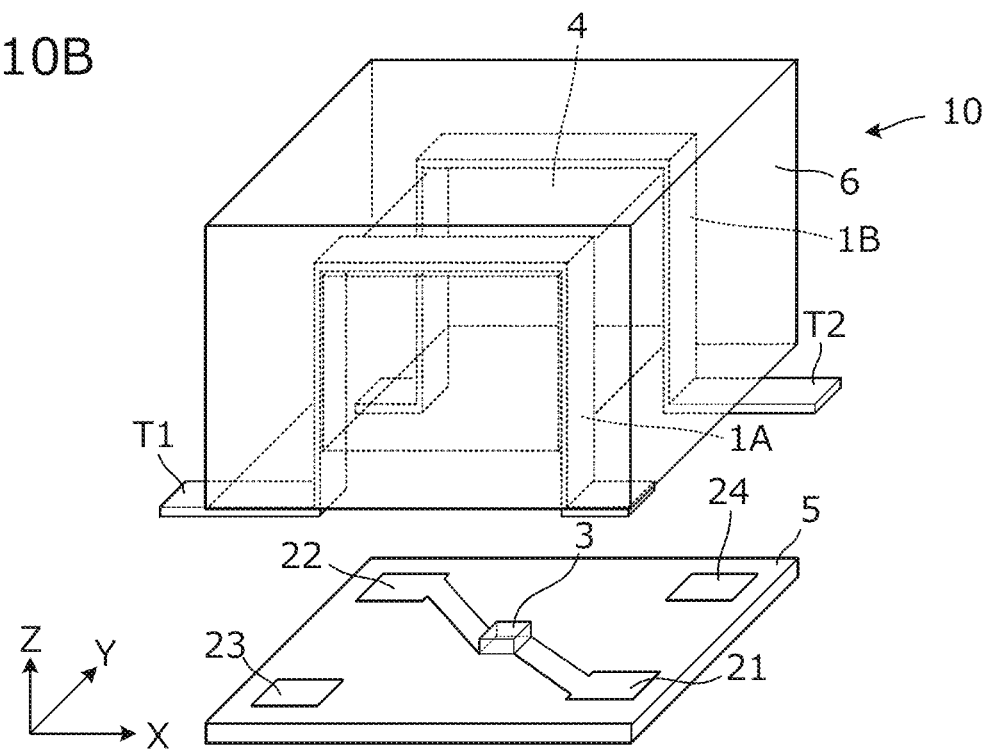

FIG. 9 is an external perspective view of an RFID tag 102 according to the second exemplary embodiment. FIG. 10A and FIG. 10B are diagrams showing a structure and a component of the RFID tag 102.

As shown in FIG. 9, the RFID tag 102 according to the second exemplary embodiment includes inside first conductors 1A and 1B, and second conductors 21 and 22, and includes terminals T1 and T2 that are made of metal and project outside. As with the RFID tagged article shown in the first exemplary embodiment, the terminals T1 and T2 are welded to a conductive element to provide an RFID tagged article.

The RFID tag 102, as shown in FIG. 10B, includes a first conductor element 10, an insulating base material 5, and an RFIC 3. Specifically, the RFIC 3 and the first conductor element 10 are mounted on the insulating base material 5 to provide the RFID tag 102 shown in FIG. 9.

The first conductor element 10 includes first conductors 1A and 1B, a magnet 4, and a molding resin 6 that covers the first conductors 1A and 1B, and the magnet 4. In other words, a portion of the first conductors 1A and 1B and the entirety of the magnet 4 are resin-molded with the molding resin 6 and integrated together. The magnet 4 has a rectangular parallelepiped shape, and is covered with the molding resin 6 while the three surfaces are surrounded by the first conductors 1A and 1B. The material of the first conductors 1A and 1B and the material of the magnet 4 are the same as the material described in the first exemplary embodiment.

The second conductors 21 and 22 and first conductor mounting electrodes 23 and 24 are provided on the insulating base material 5. The RFIC 3 and the first conductor element 10 are mounted on the insulating base material 5 by the solder reflow process. It is to be noted that solder paste is not shown in FIG. 10A and FIG. 10B.

As shown in FIG. 10A, each of the first conductors 1A and 1B is an element provided such that a metal plate is bent at a right angle in four places. One end of the first conductor 1A is connected to an end portion of the second conductor 21, and the other end of the first conductor 1A is connected to the first conductor mounting electrode 23. In addition, one end of the first conductor 1B is connected to an end portion of the second conductor 22, and the other end of the first conductor 1B is connected to the first conductor mounting electrode 24.

The first conductors 1A and 1B are connected to the second conductors 21 and 22. Moreover, as will be described later, while the terminals T1 and T2 are connected to the conductive element 201, the first conductors 1A and 1B, the second conductors 21 and 22, and the conductive element define a coil-shaped conductor including about two turns. Then, the terminals T1 and T2 are structured to project outward from the winding range of the coil-shaped conductor. The RFIC 3 is inserted in the middle of the coil-shaped conductor defined by the first conductors 1A and 1B and the second conductors 21 and 22, that is, the first conductors 1A and 1B, the second conductors 21 and 22, and the RFIC 3 define an electrical loop.

A winding axis direction of the coil-shaped conductor, in an orthogonal X-Y-Z coordinate system shown in FIG. 9, FIG. 10A, and FIG. 10B, is a direction parallel to a Y axis. The coil-shaped conductor is a rectangle, when viewed in the winding axis direction, and the first conductors 1A and 1B provide three sides of the rectangle, and the second conductors 21 and 22 provide a remaining one side of the rectangle.

Figure 11:
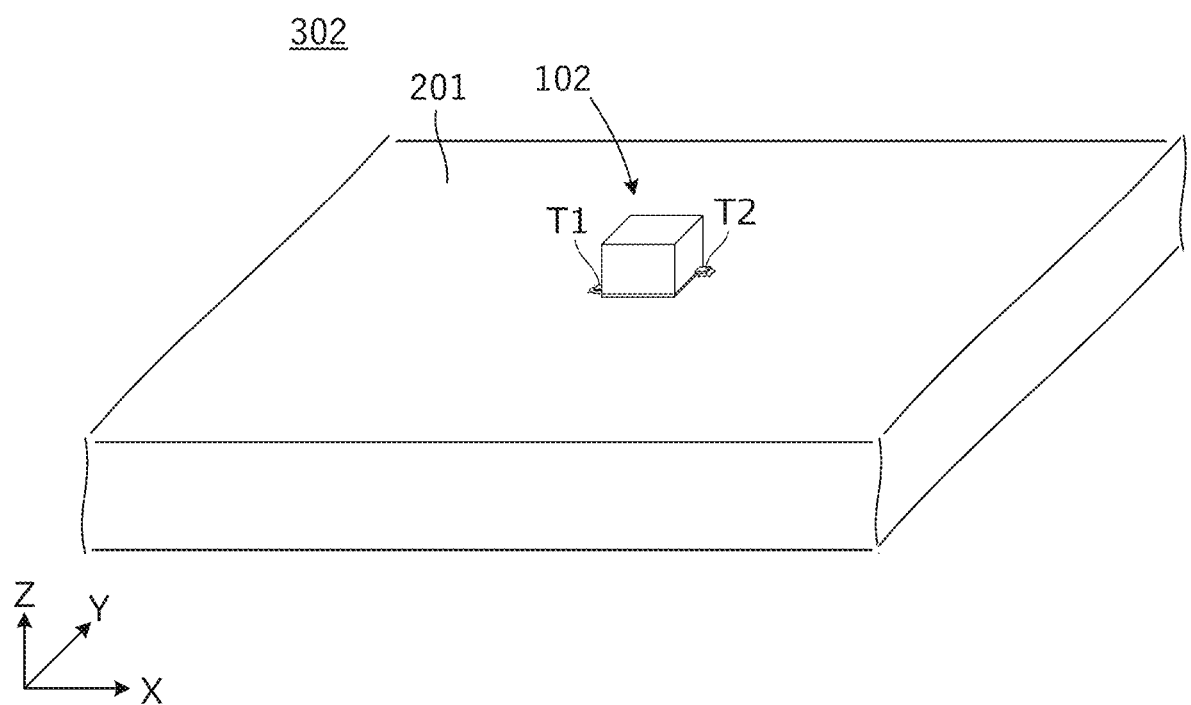
FIG. 11 is a perspective view of the RFID tagged article 302.

FIG. 11 is a perspective view of the RFID tagged article 302. The RFID tagged article 302 includes a conductive element 201 and an RFID tag 102. The RFID tag 102 includes terminals T1 and T2 that are welded to the conductive element 201. As described above, such a state provides a structure in which the first conductors 1A and 1B, the second conductors 21 and 22, and the conductive element 201 define a coil-shaped conductor including about two turns and the RFIC 3 is inserted in the middle of a coil-shaped conductor path. In this manner, the RFID tagged article 302 is provided.

In the second exemplary embodiment, the conductive element 201 is configured to be used as a portion of the coil-shaped conductor. That is, the conductive element 201 is not disposed in parallel to the second conductors 21 and 22, so that the design of an RFID tag is simplified and stable characteristics are able to be obtained.

Third Exemplary Embodiment

A third exemplary embodiment provides an example of an RFID tag and an RFID tagged article that are different from the first and second exemplary embodiments in the area in which resin molding is performed.

Figure 12:
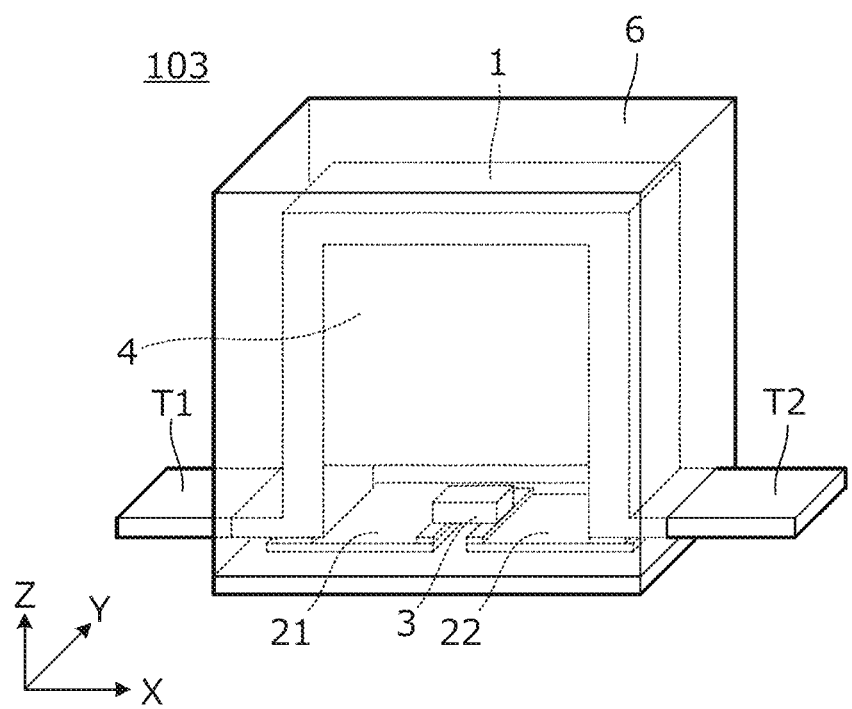
FIG. 12 is an external perspective view of an RFID tag 103 according to a third exemplary embodiment of the present invention.
Figure 13A:
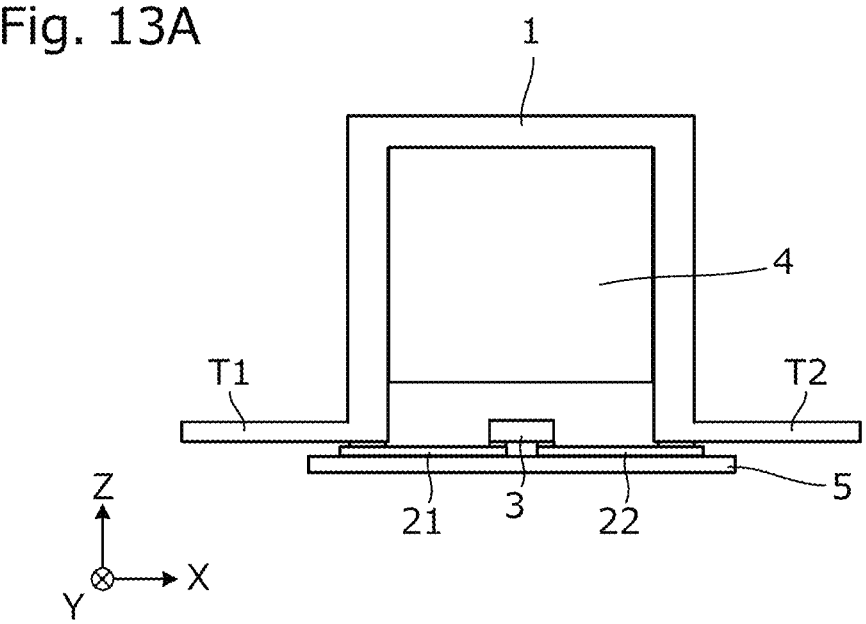
FIG. 13A is a front view in the middle of manufacturing of the RFID tag 103.
Figure 13B:
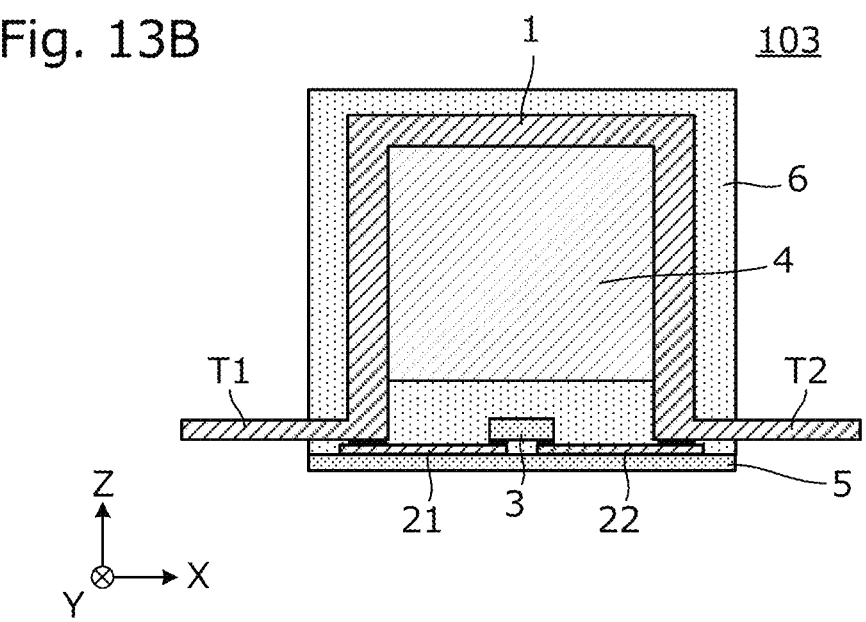
FIG. 13B is a vertical cross-sectional view of the RFID tag 103.

FIG. 12 is an external perspective view of an RFID tag 103 according to the third exemplary embodiment. FIG. 13A is a front view in the middle of manufacturing of the RFID tag 103, and FIG. 13B is a vertical cross-sectional view of the RFID tag 103.

As shown in FIG. 12, the RFID tag 103 according to the third exemplary embodiment includes inside a first conductor 1 and second conductors 21 and 22, and includes terminals T1 and T2 that are made of metal and project outside. The second conductors 21 and 22 are provided on the insulating base material 5, and the RFIC 3 is mounted on the insulating base material 5. The magnet 4 is fitted to the first conductor 1.

The RFID tag 103 according to the third exemplary embodiment, as shown in FIG. 13A, first mounts the RFIC 3 on the insulating base material 5, and subsequently mounts the first conductor 1 on the insulating base material 5. The magnet 4 is fitted to the first conductor 1, so that a space is provided between the insulating base material 5 and the magnet 4. Subsequently, as shown in FIG. 13B, the molding resin 6 covers the upper portion of the insulating base material 5. In other words, a portion of the first conductor 1 and the entirety of the magnet 4 are resin-molded with the molding resin 6 and integrated together.

It is to be noted that, in a case in which the first conductor 1 is made of ferromagnetic metal such as iron or iron alloy, since the magnet 4 is attracted to the first conductor 1 without relying on the fitting, the resin molding may be performed in such a state.

Figure 14A:
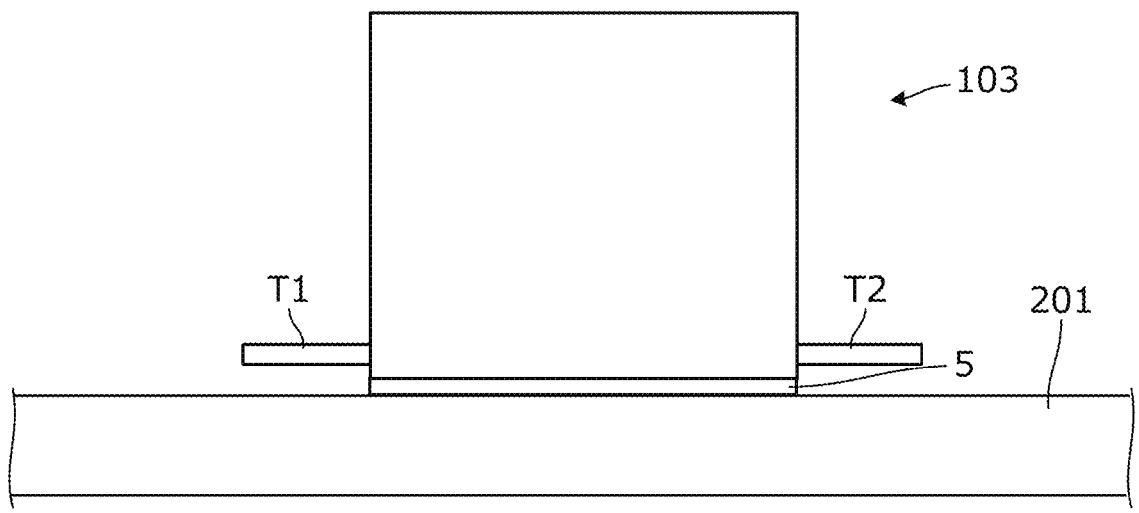
FIG. 14A is a diagram showing a state in the middle of configuring an RFID tagged article 304.
Figure 14B:
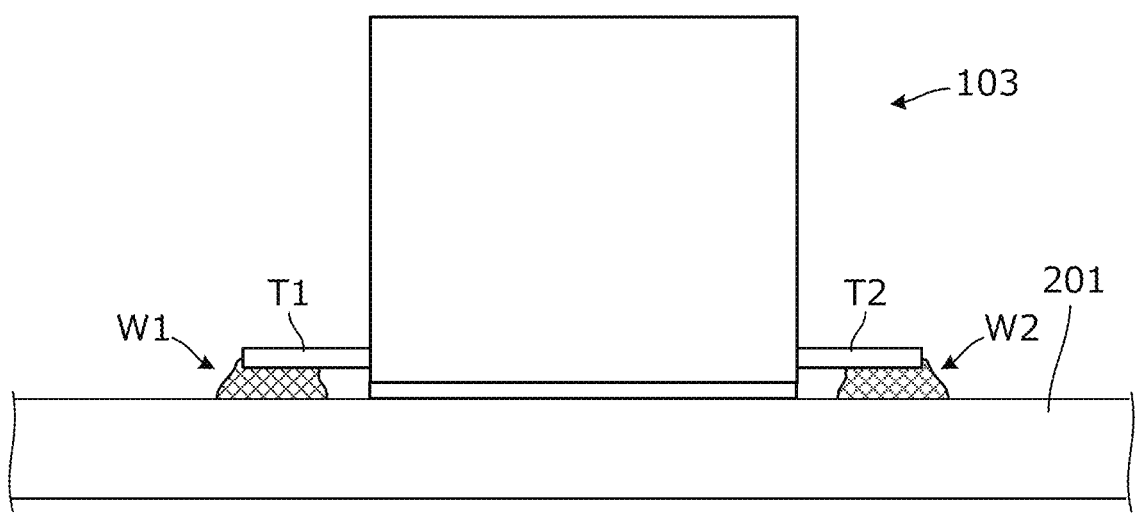
FIG. 14B is a diagram showing a configuration of the RFID tagged article 304.

FIG. 14A is a diagram showing a state in the middle of configuring an RFID tagged article 304, and FIG. 14B is a diagram showing a configuration of the RFID tagged article 304. The RFID tagged article 304 includes a conductive element 201 and an RFID tag 103. First, as shown in FIG. 14A, the RFID tag 103 is placed on the conductive element 201, and the terminals T1 and T2 of the RFID tag 103 are brought closer to a surface of the conductive element 201. Subsequently, the terminals T1 and T2 of the RFID tag 103 are welded to the conductive element 201 to provide welded portions W1 and W2 between the terminals T1 and T2 and the conductive element 201. Accordingly, an RFID tagged article 304 shown in FIG. 14B is provided.

Other Exemplary Embodiments

Although the above example describes the RFID tag as a single body in the drawing at any stage of a manufacturing process, it is noted that a large number of consecutive RFID tags may be simultaneously manufactured, and may be separated into an individual RFID tag in the final step. For example, an individual first conductor 1 may be manufactured in a state of being connected to a hoop material extending in the Y axis direction through the terminals T1 and T2, and each RFID tag may be cut and separated from the hoop material in the final stage.

In addition, the insulating base material 5 may also be manufactured in each step in a state of being a mother substrate that is finally divided, so that a large number of insulating base materials 5 may be simultaneously manufactured.

In addition, although the above example describes the configuration with a capacitance component provided in the RFIC 3 as the capacitor of the LC resonant circuit, a chip capacitor to be connected in parallel to the RFIC 3 may be mounted on the insulating base material 5. In addition, the insulating base material 5 may include a capacitor of a resonant circuit defined by a conductor pattern.

In addition, as the insulating base material 5, a multilayer substrate including a plurality of base materials that are stacked on one another may be used to provide a conductor pattern on an inner layer according to an exemplary aspect. In addition, a substrate made of a ceramic material instead of a resin material may be used. In addition, the conductor pattern on a first surface and the conductor pattern on a second surface may be provided by printing of a conductive material instead of metal foil.

Finally, it is generally noted that the above described exemplary embodiments are to be considered in all respects as illustrative and not restrictive. It is to be understood that variations and modifications will be apparent to those skilled in the art.

What is claimed is:

1. An RFID tag comprising:
   an insulating base material;
   a first conductor;
   a second conductor connected to the first conductor to form a coil-shaped conductor or a loop-shaped conductor; and
   an RFIC electrically connected to the second conductor, with the RFIC being positioned within an area surrounded by the first and second conductors when view from an opening direction of the coil-shaped conductor or loop-shaped conductor formed by the first and second conductors,
   wherein the second conductor is disposed on top of the insulating base material and the first conductor and the RFIC are disposed on top of the second conductor,
   wherein the first conductor includes an end that projects from the coil-shaped conductor or the loop-shaped conductor to an outside past a side of the insulating base material with the first conductor being connected to the second conductor, and
   wherein the end of the first conductor is mounted on a same plane as the RFIC.

2. The RFID tag according to claim 1, wherein the first and second conductors form a complete coil-shaped conductor or a complete loop-shaped conductor.

3. The RFID tag according to claim 1, further comprising a molding resin that covers a periphery of the first conductor.

4. The RFID tag according to claim 3, wherein the first conductor is integrated with the molding resin to collectively define a first conductor element.

5. The RFID tag according to claim 4, wherein the RFIC and the first conductor element are mounted on the insulating base material.

6. The RFID tag according to claim 5, wherein the coil-shaped conductor or the loop-shaped conductor has a rectangular shape relative to a winding axis direction of the coil-shaped conductor or the loop-shaped conductor.

7. The RFID tag according to claim 6, wherein the first conductor forms three sides of the rectangle and the second conductor forms a fourth side of the rectangle.

8. The RFID tag according to claim 7, wherein the RFIC is coupled to the second conductor and disposed within an opening of the coil-shaped conductor or the loop-shaped conductor when viewed in the opening direction.

9. The RFID tag according to claim 7, further comprising a magnet covered by the molding resin, with the magnet being disposed in a position in which three surfaces of the magnet are surrounded by the first conductor.

10. The RFID tag according to claim 1, wherein the first conductor comprises a pair of first conductors, each having a first and second end.

11. The RFID tag according to claim 10, wherein the second conductor electrically connects respective first ends of the pair of first conductors to each other with the RFIC disposed therebetween.

12. The RFID tag according to claim 11, wherein the respective second ends of the pair of first conductors form respective ends that project from the coil-shaped conductor or the loop-shaped conductor to the outside past respective sides of the insulating base material.

13. An RFID tag comprising:
an insulating base;
at least one first conductor mounted on the insulating base and including a pair of terminals that extend outward in a direction parallel to a surface of the insulating base, with the pair of terminals of the at least one first conductor extending in opposing directions away from each other;
at least one second conductor mounted on the insulating base and connected to the at least one first conductor to form a loop-shaped conductor; and
an RFIC electrically connected to the at least one second conductor and disposed inside the loop-shaped conductor when view from an opening direction of the loop-shaped conductor,
wherein the pair of terminals of the at least one first conductor are mounted on the insulating base and in a same plane as the RFIC, such that the RFIC is disposed directly between the pair of terminals and in line with the pair of terminals in the direction parallel to the surface of the insulating base.

14. The RFID tag according to claim 13, wherein the pair of terminals of the at least one first conductor project outward, respectively, from the loop-shaped conductor.

15. The RFID tag according to claim 13, further comprising a molding resin that covers a periphery of the at least one first conductor.

16. The RFID tag according to claim 15, wherein the at least one first conductor is integrated with the molding resin to collectively define a first conductor element.

17. The RFID tag according to claim 16, wherein the loop-shaped conductor has a rectangular shape relative to a winding axis direction of the loop-shaped conductor.

18. The RFID tag according to claim 13, wherein the loop-shaped conductor comprises a coil-shaped conductor.

19. The RFID tag according to claim 15, further comprising a magnet covered by the molding resin, with the magnet being disposed in a position in which three surfaces of the magnet are surrounded by the at least one first conductor.

20. An RFID tagged article comprising:
an article including a conductive element; and
an RFID tag including:
an insulating base material;
a first conductor;
a second conductor connected to the first conductor to form a coil-shaped conductor or a loop-shaped conductor; and
an RFIC electrically connected to the second conductor, with the RFIC being positioned within an area surrounded by the first and second conductors when view from an opening direction of the coil-shaped conductor or loop-shaped conductor formed by the first and second conductors,
wherein the second conductor is disposed on top of the insulating base material and the first conductor and the RFIC are disposed on top of the second conductor, and
wherein the first conductor includes an end that projects from the coil-shaped conductor or the loop-shaped conductor to an outside past a side of the insulating base material and that is mounted on a same plane as the RFIC, wherein the an end of the RFID tag is welded to the conductive element.

* * * * *